J. Allard,
Drag Saw,
No 58,933.    Patented Oct. 16, 1866.
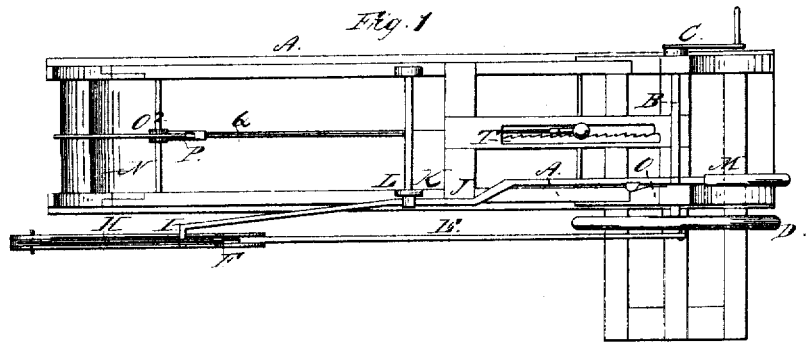
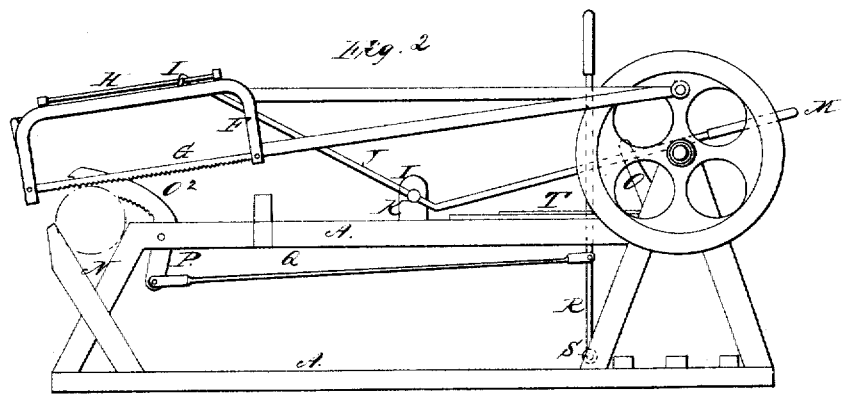

UNITED STATES PATENT OFFICE.

ISAAC ALLARD, OF BELFAST, MAINE, ASSIGNOR TO HIMSELF AND R. G. TURNER, OF SAME PLACE.

WOOD-SAWING MACHINE.

Specification forming part of Letters Patent No. 58,933, dated October 16, 1866.

*To all whom it may concern:*

Be it known that I, ISAAC ALLARD, of Belfast, Waldo county, and State of Maine, have invented new and useful Improvements in Wood-Sawing Machines; and I do hereby declare that the following is a full, clear, and exact description thereof, which will enable others skilled in the art to make and use the same, reference being had to the accompanying drawings, forming part of this specification.

The present invention relates to certain new and useful improvements in machines for sawing wood, whereby simplicity in construction and arrangement and efficiency in operation are obtained, as will be apparent from the following detail description thereof, reference being had to the accompanying plate of drawings, in which—

Figure 1 is a plan or top view of the machine, and Fig. 2 is a side elevation of the same.

Similar letters of reference indicate like parts.

A in the drawings represents the frame-work of the machine, made of any suitable construction to receive the various working parts of the same; B, the driving-shaft, extending across one end of the frame-work A, and turning in bearings of the same. On one end of shaft B is a crank-handle, C, for turning it, and on the other a fly or balance wheel, D, to which is hung one end of a connecting-rod, E, extending along the outside of the frame-work A, and having a frame, F, attached to its other or outer end, carrying a straight saw-blade, G.

The saw-frame E, by the rod H along its upper edge, is hung in the hook or eye shaped end I of a bent angular lever, J, turning upon a fulcrum, K, of the standard L of the frame-work A, and having a handle, M, upon its other end, by depressing which handle the saw-frame can be raised from the horse N, provided for the reception of the log to be sawed at one end of the frame-work A, and there held by interlocking the lever with the spring-catch O secured to the main frame-work, the saw-frame, as the driving-shaft is turned, being moved forward and backward upon the hook-shaped end of the angular lever J, in which it is hung, and thus, when the saw-frame is lowered over and across the log held in the saw-horse, cutting or severing the same, as is plainly apparent by an inspection of the drawings.

In order to firmly hold or secure the log in the saw-horse while being operated upon by the saw, I have hung upon the frame-work A, between its two sides, a bent or angular-shaped dog, $O^2$, one edge of which is toothed or serrated in such a position that it can be swung over and across the log, and by setting its teeth therein serve to firmly hold it in position, this dog O, by its lower end P being connected through a rod, Q, with an upright or vertical lever or rod, R, having a handle upon its upper end and turning upon a fulcrum at S of the frame-work. By means of this handle-lever R the dog O can be brought down upon the log or raised from the same, it being held or secured in either position by simply interlocking it with the toothed or ratchet-bar T of the frame-work A.

I claim as new and desire to secure by Letters Patent—

1. The pivoted angular lever J, frame F, spring-catch O, and connecting-rod E, arranged and operating substantially as described for the purpose specified.

2. The pivoted bent dog $O^2$, rod Q, rod R, and toothed bar T, constructed and operating substantially as and for the purpose specified.

ISAAC ALLARD.

Witnesses:
TIMOTHY CHASE,
GEORGE S. CHASE.